United States Patent [19]
Barkey

[11] Patent Number: 4,886,598
[45] Date of Patent: Dec. 12, 1989

[54] LIQUID MEMBRANE COATED ION-EXCHANGE COLUMN SOLIDS

[75] Inventor: Dale P. Barkey, Berkeley, Calif.

[73] Assignee: The United States of America as represented by the Department of Energy, Washington, D.C.

[21] Appl. No.: 164,659

[22] Filed: Mar. 7, 1988

Related U.S. Application Data

[62] Division of Ser. No. 922,426, Oct. 23, 1986, Pat. No. 4,747,949.

[51] Int. Cl.⁴ .................. B01D 13/00; B01D 15/04
[52] U.S. Cl. ........................ 210/263; 210/502.1; 210/506; 502/402
[58] Field of Search .............. 210/638, 643, 670, 678, 210/679, 681, 688, 263, 500.21, 500.27, 502.1, 504, 506; 502/402; 521/27, 28

[56] References Cited
U.S. PATENT DOCUMENTS 3,779,907 12/1973 Li et al. ........................ 210/638
4,048,064 9/1977 Clark ............................. 210/638

Primary Examiner—Ivars Cintins
Attorney, Agent, or Firm—L. E. Carnahan; Roger S. Gaither; William R. Moser

[57] ABSTRACT

This invention relates to a method for improving the performance of liquid membrane separations by coating a liquid membrane onto solid ion-exchange resin beads in a fixed bed. Ion-exchange beads fabricated from an ion-exchange resin are swelled with water and are coated with a liquid membrane material that forms a film over the beads. The beads constitute a fixed bed ion-exchange column. Fluid being treated that contains the desired ion to be trapped by the ion-exchange particle is passed through the column. A carrier molecule, contained in the liquid membrane ion-exchange material, is selected for the desired ion in the fluid. The carrier molecule forms a complex with the desired ion, transporting it through the membrane and thus separating it from the other ions. The solution is fed continuously until breakthrough occurs at which time the ion is recovered, and the bed is regenerated.

7 Claims, 1 Drawing Sheet

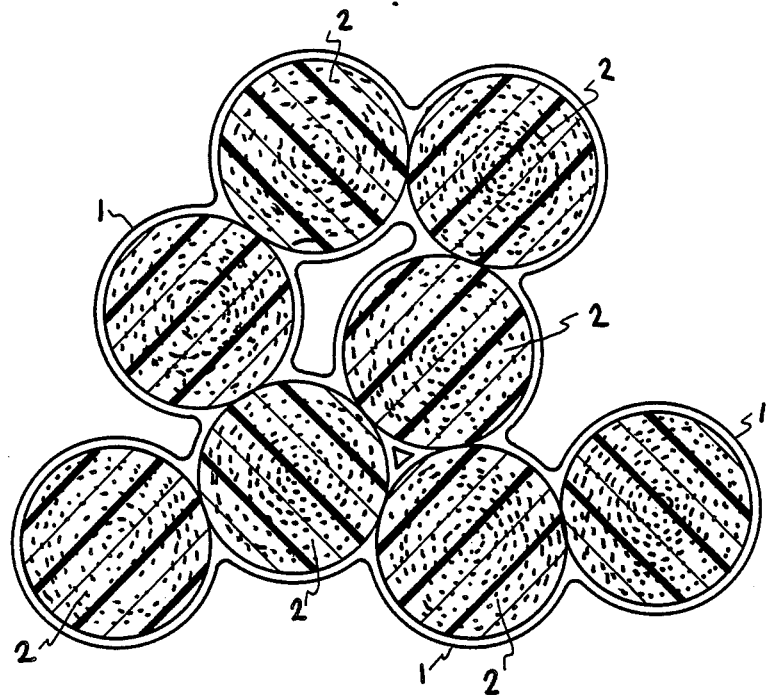

LIQUID MEMBRANE COATED ION-EXCHANGE COLUMN SOLIDS

BACKGROUND OF THE INVENTION

The invention described herein arose in the course of, or under, Contract No. DE-AC03-76SF00098 between the United States Department of Energy and the University of California.

This is a division of application Ser. No. 922,426 filed Oct. 23, 1986, now U.S. Pat. No. 4,747,949.

The present invention relates to a process for improving the performance of liquid membrane separations. More particularly, the present invention pertains to a process for improving the performance of the liquid membrane separations by coating the liquid membrane onto a solid ion-exchange resin in a fixed bed.

It is well known to the art that the ion-exchange separation method can be used to remove ions from a solution. Ion exchange is a chemical reaction in which mobile hydrated ions of a solid are exchanged, equivalent for equivalent, for ions of like charge in solution. The solid has an open, fishnet-like structure, and the mobile ions neutralize the charged, or potentially charged, groups attached to the solid matrix. The solid matrix is termed the ion exchanger.

An ion-exhange membrane, according to the broadest definition, is any ion-exchange material, irrespective of its geometrical form, which can be used as a separation wall between two solutions. Ion-exchange membranes combine the ability to act as a separation wall between two solutions with the chemical and electro-chemical properties of ion exchangers. When in contact with electrolyte solutions, the membrane contains a large number of ions. Ions with the same charge as those contained in the exchange membrane are admitted to it, and thus have little difficulty in passing through from one solution to the other. Ions with opposite charge are excluded from the membrane and find it difficult to pass through. The exchange resin is permeated with electrolyte before coating. Thus, the membrane is permselective.

U.S. Pat. No. 3,410,794 to Li discloses a process for separating mixtures into their component parts by means of selective permeation through liuid membranes containing emulsion-forming surfactants. These are usually globules having diameters in a range of 0.2 to 2 mm. These liquid membranes can be one of two types: either water-in-oil-in-water or oil-in-water-in-oil. In general the liquid membranes are used to sequester chemical or biochemical reagents, while allowing reactants to enter the globule where they are trapped or transformed. Further processing is required for reuse of the oil and the stripping solution.

Solid supported liquid membranes are another form of liquid membrane technology for extracting materials from aqueous solutions. An ordinary polymeric membrane is formed from a porous sheet of plastic into which the liquid membrane material is absorbed. This membrane is used to separate the strip solution from the feed solution. The desired ions are carried across the liquid membrane in the plastic pores to the strip solution. The role of the membrane is to select the desired molecule in the feed solution and replace it, equivalent for equivalent, by another ion from the strip solution. This liquid membrane technology can be applied in extraction procedures for a copper and a variety of materials. For instance, a pollutant such as phenol can be trapped within a liquid membrane equipped with appropriate agents. Other materials including uranium and chromate ions have been extracted from solutions using these membranes. Other types of designs are made of solid-state polymers that form a microporous support containing a liquid phase confined by capillary action. These membranes contain specific carriers, liquid ion exchangers that selectively extract the desired material.

Frankenfeld and co-workers have operated a pilot scale waste water treatment process for selective extraction of copper using a water-in-oil-in-water double emulsion. Aqueous extractant droplets are dispersed in an oil containing a surfactant and an ion carrier selective for copper. The resulting emulsion is stirred in a batch of waste water. Recovery and collapse of the extractant emulsion gives a concentrated aqueous copper solution.

Martin and Davies have proposed a similar process for the concentration of copper ore leachates prior to electrowinning. A process has also been proposed in which the liquid membrane is supported on a polymeric membrane. This sacrifices the large interfacial area of the double emulsion for a more stable and more easily formed arrangement.

Legman and Sinfriades have proposed a recovery of copper from aqueous solutions by means of supported liquid membranes. Thus, there remains a need in the art for a method of performing liquid membrane separations which result in the production of a product such as copper ion in high yield.

SUMMARY OF THE INVENTION

Accordingly, it is an object of the present invention to provide an improved method for performing liquid membrane separations wherein the liquid membrane is coated onto solid ion-exchange particles used in an ion-exchange fixed bed column.

Another object of the present invention is to provide a liquid membrane which is coated onto solid ion-exchange resin beads or other solid ion-exchange particles for use in a fixed bed.

Yet another object of the present invention is to provide a method for using a solid sorbent material as a membrane support and as a reservoir for ions.

A further object of the present invention is to provide a method for increasing the efficiency of removing copper ions from a solution.

The fixed bed ion-exchange column of the present invention comprises a column, a plurality of ion-exchange resin beads, permeated with an electrolyte, packed in said column, and a liquid membrane coating formed on each of said electrolyte containing beads. The process comprises the steps of coating ion-exchange beads with a liquid membrane forming material to form a liquid membrane on said beads; contacting a solution containing ions which can pass through said liquid membrane to absorb said ions onto said beads; optionally removing said liquid membrane from said beads; and removing absorbed ions from said ion-exchange beads.

BRIEF DESCRIPTION OF THE DRAWING

The sole FIGURE of the drawing is a cross-sectional view of coated ion-exchange particles of the present invention.

DETAILED DESCRIPTION OF THE INVENTION

Accordingly, the fixed bed ion-exchange column of the present invention comprises a column, a plurality of electrolyte filled ion-exchange resin beads in said column, and a liquid membrane formed on said beads. The ion-exchange column can be used to separate ions from a solution by contacting the ion-containing solution with the liquid membrane whereby the ions are transported through the membrane by a carrier molecule and onto the ion-exchange beads. The process of the invention comprises the steps of coating ion-exchange beads with a liquid membrane forming material to form a liquid membrane on said beads; contacting a solution which contains ions to be separated which are strongly absorbed onto said beads and which can pass through said liquid membrane; whereby said ions are absorbed onto said beads; and removing absorbed ions from said ion-exchange beads. This is accomplished because when the separation ion is strongly bound to the ion-exchange resin it produces a gradient of chemial potential between the treated solution and the electrolyte permeating the resin. This gradient drives a flux of ions across the membrane.

In a more preferred aspect, the process comprises the steps of coating ion exchange resin beads containing an electrolyte with a liquid comprising a liquid membrane material and a carrier molecule for the ion to be extracted, to form a liquid membrane on said beads which is formed of the liquid membrane material and the carrier molecule, contacting a solution containing ions to be extracted with said liquid membrane thereby absorbing said ions onto said beads until breakthrough of the ions; optionally removing the liquid membrane from said beads; regenerating said column by contacing said column with aqueous sulfuric acid in reverse flow; and rinsing the column with a low ionic strength solution.

The ion-exchange particles are fabricated from an ion-exchange resin such as a strong cation exchange resin. Suitable resins include Dowex 50W, Amberlite XAD-2, Amberlite XAD-4, Aberlite IR-118, Diaion SK1A, Diaion SK1B, Diaion SK104, Diaion SK105, Diaion SK106, Dowex 30, Cochranex CMV, Permutit Q220, Dualite 25D, Dualite 20X4, Allassion CM, Bio-Rex 40 and Lewatit S115. The ion-exchange particles should be formed from a resin which strongly adsorbs the metal ion.

The liquid membrane material can be any material which forms a liquid membrane on the ion-exchange particles and which allows a complex of the carrier molecule and the metal ion to pass through the liquid membrane and absorb into the ion-exchange particles. Suitable liquid membrane materials are a mixture of a surfactant and an organic solvent.

A wide variety of different surfactant groups may be utilized. The various surfactant groups include anionic surfactants, cationic surfactants, nonionic surfactants, amphoteric surfactants and miscellaneous surfactants such as polymeric surfactants and fluorocarbon surfactants. Nonionic polymeric surfactants are particularly preferred. Specific examples of surfactants include Span 80 (available from Atlas Industries, Inc.), and Sorbitan Esters (laurate and oleate). The surfactant is present in an amount of about one to six weight percent, preferably about three to four weight percent with respect to the solvent. Preferred are non-ionic, non-water soluble, low HLB number surfactants.

The organic solvent should be a solvent possessing the following characteristics: (1) be insoluble and immiscible with water, and (2) be compatible with sorbitan esters, and includes non-volatile or higher boiling hydrocarbons.

Suitable solvents include Solvent 100 Neutral which is a light distillate lubricating oil (from a paraffin based crude oil), n-hexane, n-heptane, xylene, benzene, kerosene, etc.

The carrier molecule is specific for the metal ions to be removed from the solution and is present in the solution in an amount of ten to sixty weight percent, prefereably thirty-five to forty-five weight percent with respect to the solvent. The carrier molecule is preferably a chelating agent for the metal ion to be removed. The chelating agent is preferably hydrophobic and forms a neutral complex with the metal ion to be removed. Suitable chelating agents may include crown ethers for alkali metals, ammonium and amino ions, quaternary ammonium salts suitable for tungsten, nickel and cobalt and bis(2-ethyl hexyl)phosphate suitable for zinc.

The metal ions to be removed are preferably heavy metal ions such as copper, chromium, zinc, lead, nickel, cobalt, palladium and mercury.

As shown in the FIGURE of the drawing, a liquid membrane 1 is coated onto ion-exchange beads 2 in a fixed bed column. The liquid membrane coated ion-exchange particles may also be used in a fluidized bed or a stirred tank. Beads of an ion-exchange material fabricated from an ion-exchange resin are swelled with water. The beads are coated with a liquid membrane material such as oil that forms a film over the beads' surface and that is impermeable to ions in general but permit penetration of the desired metal ions. A fluid being treated which contains the desired ion to be entrapped by the ion-exchange particle is passed through the column. The carrier molecule, contained in the liquid membrane, is selective for the desired ion in the fluid. For example, the carrier of the following formulat (I) is selective for copper.

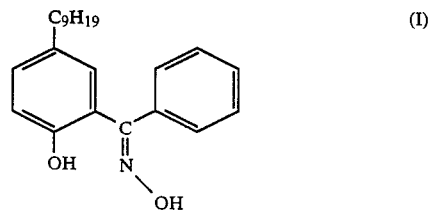

It forms a complex (II) with the copper ion transporting the copper ion through the membrane.

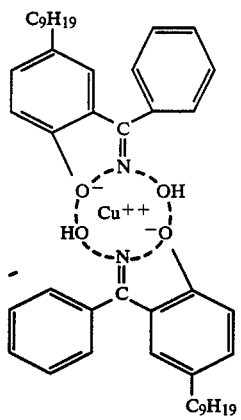

(II)

In this way, the ions to be extracted from the fluid are separated from the other ions. The solution to be treated is fed continuously until breakthrough occurs. Breakthrough occurs when the concentration of the metal ion to be removed in the treated water has reached the highest acceptable level due to saturation of the bed. A suitable method can be employed to remove the membrane material, if desired, before recovery of the ion. Alternatively, the metal ions may be removed from the ion-exchange resin beads through the liquid membrane without removing the membrane from the ion-exchange resin beads. This invention can be applied to any ion-exchange problem that calls for selectively removing an ion for which there is a suitable ion-exchange particle and a selective liquid membrane formulation.

This invention, which employs a liquid membrane in combination with solid ion-exchange resin beads in a fixed bed, acquires some advantages of both methods. The fixed bed process provides a strong driving force enabling the ion-exchange particle to strongly sorb the ion. Because the fluid requiring treatment is passed through the column, there are several stages of contact in a single operation. Copper ions are more thoroughly removed as the fluid moves through the bed encountering fresh particles.

The liquid membrane coated ion-exchange column of the present invention does not require agitation. Consequently, an expensive, cumbersome, stirring apparatus is eliminated and membrane material loss by entrainment in the effluent is reduced, also diminishing the loss of the expensive carrier material. The strip material is not spilled into the effluent; if the membrane breaks, since the particle maintains it position in the fixed bed. Since it is not necesary to collapse the membrane material, it is not then necessary to separate the membrane from the waste water. However, like the double emulsion liquid membrane, this invention, by coating the resin bead with a similar type membrane, provides a large surface area for mass transfer of ions.

The liquid membrane coated ion-exchange column may provide greater efficiency in copper removal than other methods. Because the fluid being treated is passed through a fixed bed ion-exchange column and because there are several stages of contact, the fixed bed provides a strong driving force and the copper ions are more thoroughly removed as the fluid encounters fresh particles. Since this method does not require stirring, an expensive stirring apparatus is not needed, thus reducing the method's cost and simplifying the operation.

Membrane material loss by entrainment is reduced, diminishing the loss of the expensive carrier molecule.

Should the membrane material beak, the ion-exchange particle maintains its position in the fixed bed as noted above. Furthermore, since it is not necessary to collapse the membrane material, this alleviates the necessity for its separation from the treated water. When the ion-exchange resin is regenerated, the copper is in a form easily processed to provide metallic copper.

The liquid membrane coated ion-exchange particle of the present invention may also be used in a fluidized bed or a stirred tank. This invention may be applied to any ion-exchange problem that calls for selectively removing an ion for which there is a suitable ion-exchange particle and a selective liquid membrane formulation. Additionally, the technique of coating sorbent materials with a liquid membrane may be applied to sorption processes other than ion exchange.

The following example specially illustrates the practice of the present invention.

EXAMPLE 1

This example, employing a liquid membrane coated ion-exchange column, is proposed for copper extraction from waste waters and ore leachates. A fixed bed ion-exchange column containing beads that are 0.08 cm in diameter and which are made from Dowex-50, a strong acid cation-exchange resin, is prepared. The bed has a height of 100 cm and a diameter of 3 cm. A liquid membrane material consisting of an isoparaffinic solvent (S100N, manufactured by Exxon) which contains 1% of a nonionic polyamine used as a surfactant and strengthening agent and 2.5% of the carrier ion of the following formula:

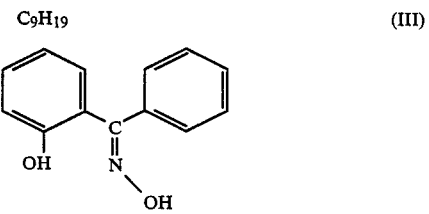

(III)

is contacted with the beads to form a 0.004 cm thick coating on the resin beads. This liquid membrane formulation is disclosed in Frankenfeld, Cahn and Li: Separation Science and Technology, 16(4), pp. 385–402, 1981. This liquid membrane formulation is described by Volkei et al: Copper Extraction by Means of Liquid Surfactant Membrane Process, Journal of Membrane Science, 6, P (1980) 19–31. The liquid membrane is formed by first fluidizing the bed by charging the membrane-forming liquid up through the bottom of the bed. This coats the beads with the membrane-forming liquid. Then again fluidize the bed by charging the solution to be extracted up through the bottom of the bed which is now ready for operation in a fixed-bed manner for the extraction.

Ore leachate containing the desired copper ion is passed through the column at a feed rate of 0.085-1/minute (2.8 gallons/feet$^2$ minute) until breakthrough is achieved. The ensuing reaction (complexing of metal ion with the carrier) takes place and the copper ion is carried through the liquid membrane and trapped in the resin beads. Actually, this reaction occurs twice. It occurs once in the forward direction on the outside surface of the membrane. This is extraction from the feed solution. It then occurs in reverse at the inside surface of the membrane. This is stripping from the membrane into the aqueous phase permeating the ion-exchange resin of the following scheme:

$$Cu_a^{++} + 2HR_o \rightarrow Cur_{2o} + 2H_a^+$$

wherein o is oil and a is aqueous.

The membrane may be left in place throughout a cycle, or it may be first removed to improve the regeneration step, then the ions are extracted. If desired, the membrane can be removed by conventional methods, such as chemically attacking the surfactant. Additional methods for the membrane removal include shearing it off with high speed fluid flow or extracting it with a solvent. Employing these latter two methods has advantages particular to this invention because they cannot be use with double emulsion liquid membranes. The copper is eluted with a sulfuric acid solution. The resulting cupric sulfate, sulfuric acid solution is suitable for electrowinning. The fixed bed can be regenerated with sulfuric acid in reverse flow and rinsed with a low ionic-strength solution. When the ion-exchange resin is regenerated, the copper is in a form easily processed to provide metallic copper. This technique of coating sorbent materials with a liquid membrane may be applied to sorption processes other than ion exchange.

The invention being thus described, it will be obvious that the same may be varied in many ways. Such variations are not to be regarded as a departure from the spirit and scope of the invention, and all such modifications as would be obvious to one skilled in the art are intended to be included in the scope of the following claims.

What is claimed is:

1. An ion exchange composition useful for separation of metal cations in an aqueous solution comprising:
   a plurality of cation exchange resin beads capable of being confined in close proximity to each other; and,
   a liquid membrane removably formed on said beads, the liquid membrane being permeable to metal cations in an aqueous solution, the liquid membrane including a carrier compound having a specificity for the cation sufficient to complex the cations in the membrane.

2. The ion exchange composition as in claim 1 wherein the liquid membrane further includes a hydrophobic solvent and a surfactant.

3. The ion exchange composition as in claim 2 wherein the carrier compound is present in an amount from about 10 wt. % to about 60 wt. % with respect to the solvent.

4. The ion exchange composition as in claim 3 wherein the liquid membrane is permeable to ions of copper and the carrier compound has the structure

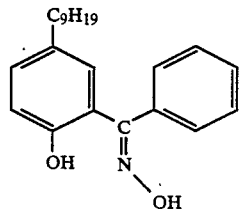

5. The ion exchange composition as in claim 2 wherein the surfactant is present in an amount from about 1 wt. % to about 6 wt. % with respect to the solvent.

6. The ion exchange composition as in claim 1 wherein the liquid membrane is permeable to ions of copper, chromium, zinc, lead, nickel, cobalt, tungsten, palladium or mercury.

7. An ion exchange column having a plurality of cation exchange resin beads packed within the column and in close proximity to each other, a liquid membrane being removably formed on said beads, the liquid membrane being permeable to heavy metal cations in an aqueous solution, the liquid membrane including a carrier compound having a specificity for the cations sufficient to complex the cations in the membrane.

* * * * *